(12) United States Patent
Todo et al.

(10) Patent No.: US 11,576,399 B2
(45) Date of Patent: Feb. 14, 2023

(54) FROZEN CONFECTIONERY EASY TO LOOSEN AND METHOD FOR PRODUCING THE SAME

(71) Applicant: LOTTE CO., LTD., Tokyo (JP)

(72) Inventors: Junko Todo, Saitama (JP); Naoya Akiyama, Saitama (JP)

(73) Assignee: LOTTE CO., LTD., Tokyo (JP)

( * ) Notice: Subject to any disclaimer, the term of this patent is extended or adjusted under 35 U.S.C. 154(b) by 106 days.

(21) Appl. No.: 16/615,128

(22) PCT Filed: May 15, 2018

(86) PCT No.: PCT/JP2018/018644
§ 371 (c)(1),
(2) Date: Nov. 19, 2019

(87) PCT Pub. No.: WO2018/221196
PCT Pub. Date: Dec. 6, 2018

(65) Prior Publication Data
US 2020/0120953 A1    Apr. 23, 2020

(30) Foreign Application Priority Data
Jun. 2, 2017   (JP) .............................. JP2017-110048

(51) Int. Cl.
*A23G 9/34*   (2006.01)
*A23G 9/04*   (2006.01)

(52) U.S. Cl.
CPC ................. *A23G 9/34* (2013.01); *A23G 9/04* (2013.01)

(58) Field of Classification Search
CPC .................................. A23G 9/04; A23G 9/34
USPC ....................................................... 426/101
See application file for complete search history.

(56) References Cited

U.S. PATENT DOCUMENTS

| | | | |
|---|---|---|---|
| 6,685,977 B1 | 2/2004 | Asano et al. | |
| 8,324,375 B2 | 12/2012 | Watanabe et al. | |
| 8,673,608 B2 | 3/2014 | Watanabe et al. | |
| 9,090,923 B2 | 7/2015 | Watanabe et al. | |
| 9,528,134 B2 | 12/2016 | Watanabe et al. | |
| 10,076,130 B2 | 9/2018 | Watanabe et al. | |
| 2010/0120710 A1* | 5/2010 | Watanabe | A23L 9/20 514/54 |
| 2013/0065293 A1 | 3/2013 | Watanabe et al. | |
| 2014/0134676 A1 | 5/2014 | Watanabe et al. | |
| 2015/0267234 A1 | 9/2015 | Watanabe et al. | |
| 2016/0008392 A1* | 1/2016 | Taniguchi | A61K 31/718 514/60 |
| 2017/0049142 A1 | 2/2017 | Watanabe et al. | |

FOREIGN PATENT DOCUMENTS

| | | | |
|---|---|---|---|
| AU | 2018275053 A1 * | 12/2019 | ............... A23G 9/04 |
| JP | 2000-279097 A | 10/2000 | |
| JP | 2001-161280 A | 6/2001 | |
| JP | 2001-258478 A | 9/2001 | |
| JP | 2002-247953 A | 9/2002 | |
| JP | 2003-033139 A | 2/2003 | |
| JP | 2006-238879 A | 9/2006 | |
| JP | 2008-136364 A | 6/2008 | |
| JP | 2017-184654 A | 10/2017 | |
| JP | 2018-024619 A | 2/2018 | |
| WO | WO 2008-136331 A1 | 11/2008 | |
| WO | WO 2010-032510 A1 | 3/2010 | |
| WO | WO 2014-133060 A1 | 9/2014 | |

OTHER PUBLICATIONS

"Isomalt Dextrin", a New Water-Soluble Dietary Fiber Made Using the Power of Enzymes from Starch. Agriculture & Livestock Industries Corporation. Starch: Investigation Reports, 2016, [retrieved on Jun. 1, 2018], <https://www.alic.go.jp/joho-d/joho08_000580.html>.

International Preliminary Reporton Patentability from International Patent Application No. PCT/JP2018/018644, dated Dec. 12, 2019.

"Isomalt Dextrin", a New Water-Soluble Dietary Fiber Made Using the Power of Enzymes from Starch. Agriculture & Livestock Industries Corporation. Starch > Investigation Reports, 2016, [retrieved on Jun. 1, 2018], <https://www.alic.go.jp/joho-d/joho08_000580.html>, non-official translation.

* cited by examiner

*Primary Examiner* — Jyoti Chawla
(74) *Attorney, Agent, or Firm* — SGPatents PLLC

(57) ABSTRACT

The present invention provides frozen confectionery (sherbet and frozen confectionery containing ice) containing a specific amount of isomaltodextrin that is easy to loosen without affecting a flavor.

7 Claims, No Drawings

FROZEN CONFECTIONERY EASY TO LOOSEN AND METHOD FOR PRODUCING THE SAME

TECHNICAL FIELD

The present invention relates to a frozen confectionery which contains isomaltodextrin and is easy to loosen, and a method for producing the same.

BACKGROUND ART

Cold food products such as ice cream, sherbet and shaved ice (hereinafter referred to as "frozen confectionery") are widely relished. Usually, the frozen confectionery is stored in a freezer of −18° C. or lower. Immediately after being taken out from the freezer, the frozen confectionery is frozen tightly and is poor in ease of loosening (disintegrative property), and such inconveniences occur that a spoon is not easily penetrated when eating. In addition, in recent years, there are increasing number of products that are eaten in a state of frappe which is prepared by pouring and mixing beverage such as coffee and milk in frozen confectionery. In the product, it is necessary for the beverage to be distributed evenly in the frozen confectionery, when the beverage is poured onto the frozen confectionery, and for this purpose, the ease of loosening (disintegrative property) of the frozen confectionery is important.

As means for blending necessary for improving the ease of loosening (disintegrative property) of the frozen confectionery, such means are known as to devise a blending ratio of sugar in the frozen confectionery and/or add a sugar alcohol, glycerin, salts and the like. However, these means exert a great influence upon a taste of the frozen confectionery, and the taste and flavor are lowered.

Various studies have been made so as to improve the texture of the frozen confectionery or ice confectionery (Patent Literatures 1, 2 and 3).

Patent Literature 1 discloses an agent for lifestyle-related diseases containing a specific branched α-glucan (isomaltodextrin), and an oral composition and a high fat food containing the same; and discloses that frozen confectionery (gelato) to which 5% of the branched α-glucan (isomaltodextrin) is added has a smooth texture (paragraph 0196).

Patent Literature 2 discloses an agent for improving physical properties and the texture of foods and drinks, containing α-1,4-glucan enzymatically synthesized by glucan phosphorylase, as an effective component, and foods and drinks containing the same; and discloses that frozen confectionery (ice candy) to which 1% of the α-1,4-glucan is added has a moderated hardness and a crispy texture (paragraph 0034).

Patent Literature 3 discloses a method for producing a frozen confectionery that imparts functions such as overrunning properties and shape retainability which are required for a stabilizer for the frozen confectionery, without giving a heavy texture, and can impart a soft and refreshing texture, to the frozen confectionery, and can impart the light texture such as brittleness, to the ice confectionery; and discloses that when water-soluble hemicellulose (soy bean polysaccharide) is added to the frozen confectionery, the friability and the penetration of the spoon are improved.

However, in conventional techniques, an effect of improving the ease of loosening of the frozen confectionery has been insufficient, and furthermore, a satisfactory result has not been obtained also in terms of the flavor.

CITATION LIST

Patent Literature

PTL 1: International Publication No. WO 2014/133060
PTL 2: Japanese Patent Application Laid-Open No. 2006-238879
PTL 3: Japanese Patent Application Laid-Open No. 2001-161280

SUMMARY OF INVENTION

Technical Problem

The present invention is directed to providing frozen confectionery (sherbet and frozen confectionery containing ice) that is easy to loosen without affecting the flavor.

Solution to Problem

The inventors of the present invention have made an extensive study in order to solve the above problems. As a result, the inventors have found that by blending isomaltodextrin with frozen confectionery which is difficult to loosen when the frozen confectionery has been taken out from the freezer, the disintegrative property of the frozen confectionery can be improved and the frozen confectionery can be easily loosened. Furthermore, the inventors have also found that by adding isomaltodextrin also to a product that is eaten in a state of frappe which is prepared by mixing the frozen confectionery with a beverage such as coffee and milk, the ease of loosening (disintegrative property) is improved when the beverage has been poured onto the frozen confectionery, and it becomes easier for the frozen confectionery to be mixed with the beverage.

In general, in order to maintain the adequate texture of frozen confectionery, it is often necessary to add additives such as stabilizers, and it is necessary to add also many stabilizers to the frozen confectionery which is blended with a lot of a fruit juice or the like, in order to increase palatability.

The present inventors have found that isomaltodextrin is effective as an additive in frozen confectionery, and have completed the present invention.

The isomaltodextrin has an effect of improving defecation and fecality, an effect of regulating blood sugar, an effect of improving lipid metabolism, an effect of inhibiting bowel disease, a prebiotics effect, and effects of regulating immunity, regulating a gastrointestinal function, promoting absorption of mineral, and reducing toxicity of harmful substance, and "Fibryxa" that is a water-soluble dietary fiber which contains the isomaltodextrin as a main component is produced and sold by Hayashibara Co., Ltd. Isomaltodextrin is a multi-branched α-glucan formed from only α-linked glucose, and is produced by decomposing starch such as corn starch with an enzyme.

Isomaltodextrin can be analyzed by an enzyme-HPLC method or a liquid chromatographic method (starch sugar related industrial analysis method).

The present invention has paid attention to this isomaltodextrin, and the greatest feature of the present invention is that it has been found that the disintegrative property is improved by blending isomaltodextrin at a very low concentration with frozen confectionery, and on the contrary, the frozen confectionery becomes hard when the amount of isomaltodextrin added increases.

Specifically, the present invention relates to: frozen confectionery comprising isomaltodextrin; frozen confectionery wherein a content by percentage of the isomaltodextrin is 0.25% to 2.0%; frozen confectionery wherein the content by percentage of the isomaltodextrin is 0.25% to 0.5%; frozen confectionery, wherein the frozen confectionery is sherbet; frozen confectionery containing ice, comprising the frozen confectionery comprising isomaltodextrin, as a mixture part, and shaved ice; frozen confectionery containing ice, wherein the mixture part and the shaved ice are comprised at a ratio of 1:1 to 1:2.5; frozen confectionery containing ice, wherein a content by percentage of the isomaltodextrin with respect to the whole frozen confectionery containing ice is 0.07% to 1.0%; frozen confectionery containing ice, wherein the content by percentage of the isomaltodextrin with respect to the whole frozen confectionery containing ice is 0.07% to 0.25%; and a method for producing frozen confectionery, comprising addition of isomaltodextrin.

Advantageous Effects of Invention

According to the present invention, it is possible to obtain frozen confectionery which is easy to loosen, can improve ease of mixing at the time when a liquid such as coffee has been poured from above, and is further rich in flavor.

DESCRIPTION OF EMBODIMENTS

Preferable embodiments of the present invention will be described below.

The frozen confectionery containing isomaltodextrin of the present invention can be produced by the following method.

A mixture that mainly contains a milk product, sugars, a stabilizer and the like to which the isomaltodextrin is added so as to be 0.2% to 2.0%, is mixed with shaved ice at a ratio of 1:1 to 1:2.5, thereafter a cup or the like is filled with the mixture, followed by hardening at −18° C. or lower. Alternatively, the mixture is mixed with the shaved ice, then the mixture is frozen in an ice cream freezer, thereafter a cup or the like is filled with the mixture, followed by hardening at −18° C. or lower. Alternatively, only the mixture is frozen without adding the shaved ice, thereafter a cup or the like is filled with the frozen mixture, followed by hardening at −18° C. or lower.

In other words, isomaltodextrin is added to frozen confectionery preferably so as to be 0.25 to 2.0%, and the above frozen confectionery is mixed with crushed ice to produce the frozen confectionery containing ice. Accordingly, the content by percentage of isomaltodextrin in the whole frozen confectionery containing ice to be obtained is 0.07% to 1.0%, and is preferably 0.07% to 0.25%.

The reason why isomaltodextrin can provide frozen confectionery having the adequate disintegrative property is considered to be as follows.

When a low concentration of isomaltodextrin is added to the frozen confectionery, a sugar concentration becomes uneven due to the action of isomaltodextrin which has water retentivity. Because of this, the bonding between the ice crystals becomes uneven, and it is considered that the frozen confectionery becomes easily loosened. On the other hand, when isomaltodextrin is added at a high concentration, isomaltodextrin binds to each other via water molecules to become a glass state, and it is considered that the frozen confectionery becomes extremely hard and becomes difficult to loosen.

In the following examples, specific examples of sherbet and frozen confectionery containing ice will be described. Here, "Sherbet" refers to a frozen confectionery obtained by freezing the mixture which mainly contains sugars, a stabilizer and the like, and occasionally contains a milk product, vegetable oil and fat, and a fruit juice, a coffee extract or the like as a flavor ingredient, and in which a fat-free milk solid is less than that of lact ice. Furthermore, "frozen confectionery containing ice" refers to frozen confectionery obtained by mixing a mixture which contains mainly a milk product, sugars and a stabilizer, with shaved or crushed ice, and freezing the mixture as needed.

EXAMPLES

Production Example of Sherbet

1. Mix powdery raw materials of granulated sugar, trehalose, a stabilizer, an emulsifier, a foaming agent, and (isomaltodextrin).
2. Add water to 100% while stirring the mixture.
3. Heat the resultant mixture up to 85° C. in a hot water bath.
4. Stir and mix the heated mixture with a TK homomixer at 10000 rpm for 15 minutes.
5. Cool the stirred mixture to 10° C. or lower.
6. Freeze the cooled mixture with an ice cream freezer to control the volume to 150%.
7. Fill the cup with the sherbet.

Production Example of Frozen Confectionery Containing Ice

1. Mix powdery materials of skimmed milk powder, vegetable oil and fat, granulated sugar, starch syrup, a stabilizer (thickening polysaccharide), an emulsifier, and (isomaltodextrin).
2. Add the oil and fat and the starch syrup to the mixture, and add water to 100% while stirring the mixture.
3. Heat the resultant mixture up to 85° C. in a hot water bath.
4. Stir and mix the heated mixture with a TK homomixer at 10000 rpm for 15 minutes.
5. Cool the stirred mixture to 10° C. or lower.
6. Mix the mixture of 5 with shaved ice cubes at a predetermined ratio.
7. Freeze the mixture of 6, as needed, and make the mixture contain a specified amount of air.
8. Fill the cup with the frozen confectionery containing ice.

Example 1

Comparison with Other Materials (Frozen Confectionery Containing Ice)

Firstly, a material suitable as an additive to be contained in the frozen confectionery was examined which could achieve the object of the present invention and was easy to loosen without losing the flavor.

Isomaltodextrin (Fibryxa (registered trademark) produced by Hayashibara Co., Ltd.), trehalose and water-soluble soybean polysaccharide were used, and were compared on frozen confectionery containing ice.

As a result, as is apparent from Table 1, isomaltodextrin was selected as a material that could suitably provide the frozen confectionery which is easy to loosen without losing the flavor.

In addition, as for the flavor evaluation, the case was evaluated as A, where the flavor was good similarly to general frozen confectionery containing ice and was adequate, the case was evaluated as B, where the flavor was slightly inferior to that of the general frozen confectionery containing ice, and the case was evaluated as C, where the flavor was inferior to that of the general frozen confectionery containing ice or there was a different flavor.

The ease of loosening was evaluated in the same manner as in the sensory evaluation which would be described later. However, the case was evaluated as 1, where the frozen confectionery containing ice was harder and more difficult to loosen than the general frozen confectionery containing ice, was evaluated as 2, where the frozen confectionery containing ice was a little harder and slightly difficult to loosen than the general frozen confectionery containing ice, was evaluated as 3, where the frozen confectionery containing ice was equivalent to the general frozen confectionery containing ice, was evaluated as 4, where the frozen confectionery containing ice was a little softer and slightly easier to loosen than the general frozen confectionery containing ice, and was evaluated as 5, where the frozen confectionery containing ice was softer and easier to loosen than the general frozen confectionery containing ice.

TABLE 1

Investigation of materials (frozen confectionery containing ice)

|  | Example | Comparative Example | Comparative Example | Comparative Example |
|---|---|---|---|---|
| Vegetable oil and fat | 2.0 | 2.0 | 2.0 | 2.0 |
| Skimmed milk powder | 5.0 | 5.0 | 5.0 | 5.0 |
| Granulated sugar | 25.5 | 25.5 | 24.5 | 25.5 |
| Starch syrup | 30.0 | 30.0 | 30.0 | 30.0 |
| Emulsifier | 0.2 | 0.2 | 0.2 | 0.2 |
| Stabilizer | 0.1 | 0.2 | 0.2 | 0.1 |
| Isomaltodextrin | 0.5 |  |  |  |
| Trehalose |  |  | 1.0 |  |
| Water-soluble soybean polysaccharide |  |  |  | 0.3 |
| Water | 36.7 | 37.1 | 37.1 | 36.9 |
| Total | 100.0 | 100.0 | 100.0 | 100.0 |
| Flavor | A | B | C | A |
| Ease of loosening | 5 | 2 | 1 | 4 |

The present composition shows the composition of the mixture part.
Mixture:Ice = 45:55

Example 2

Next, a suitable content of isomaltodextrin (Fibryxa), which could achieve the object of the present invention, was investigated on the frozen confectionery containing ice and sherbet.

As is apparent from the results of Table 2 and 3 below, it can be easily understood that when the content by percentage of isomaltodextrin is 0.25% to 2.0%, and particularly is 0.25% to 0.5%, the frozen confectionery can be provided which is preferable and easily loosened.

TABLE 2

Investigation of concentration
(frozen confectionery containing ice)

|  | Cont | 0.25 | 0.5 | 1.0 | 2.0 | 5.0 |
|---|---|---|---|---|---|---|
| Vegetable oil and fat | 3.00 | 3.00 | 3.00 | 3.00 | 3.00 | 3.00 |
| Skimmed milk powder | 7.40 | 7.40 | 7.40 | 7.40 | 7.40 | 7.40 |
| Granulated sugar | 33.15 | 33.33 | 33.51 | 33.85 | 34.53 | 36.55 |
| Starch syrup | 11.20 | 10.63 | 10.06 | 8.93 | 6.73 | 0.00 |
| Emulsifier | 0.20 | 0.20 | 0.20 | 0.20 | 0.20 | 0.20 |
| Stabilizer | 0.25 | 0.25 | 0.25 | 0.25 | 0.25 | 0.25 |
| Isomaltodextrin | 0.00 | 0.25 | 0.50 | 1.00 | 2.00 | 5.00 |
| Water | 44.80 | 44.94 | 45.08 | 45.37 | 45.89 | 47.60 |
| Total | 100.0 | 100.0 | 100.0 | 100.0 | 100.0 | 100.0 |
| Ease of loosening | B | AA | AA | A | B | C |

The present composition shows the composition of the mixture part.
Mixture:Ice = 45:55

TABLE 3

Investigation of concentration (sherbet)

|  | Cont | 0.25 | 0.5 | 1.0 | 2.0 | 5.0 |
|---|---|---|---|---|---|---|
| Granulated sugar | 8.00 | 7.75 | 7.50 | 7.00 | 6.00 | 3.00 |
| Trehalose | 1.50 | 1.50 | 1.50 | 1.50 | 1.50 | 1.50 |
| Emulsifier | 0.15 | 0.15 | 0.15 | 0.15 | 0.15 | 0.15 |
| Stabilizer | 0.27 | 0.27 | 0.27 | 0.27 | 0.27 | 0.27 |
| Foaming agent | 0.75 | 0.75 | 0.75 | 0.75 | 0.75 | 0.75 |
| Isomaltodextrin | 0.00 | 0.25 | 0.50 | 1.00 | 2.00 | 5.00 |
| Water | 89.33 | 89.33 | 89.33 | 89.33 | 89.33 | 89.33 |
| Total | 100.0 | 100.0 | 100.0 | 100.0 | 100.0 | 100.0 |
| Ease of loosening | B | AA | AA | A | B | C |

Sensory Evaluation

Monitors comparatively evaluated the hardness and ease of loosening of the frozen confectionery, which depended on the amount of isomaltodextrin added, sensorily.

The evaluation samples were determined to be the same sherbet and frozen confectionery containing ice as compositions shown in Tables 2 and 3. However, the mixing ratio of the mixture to the shaved ice of the frozen confectionery containing ice was set at 1:1.

Result

In the sensory evaluation of the frozen confectionery, each monitor compared the difference in hardness and looseness between the samples and the control product to which isomaltodextrin was not added (Cont in Tables 2 and 3), and put a circle to any of the following corresponding items in a recording form: the sample was harder and more difficult to loosen than the control product; the sample was a little harder and slightly difficult to loosen than the control product; the sample was equivalent to the control product; the sample was slightly softer and slightly easier to loosen than the control product; and the sample was softer and easier to loosen than the control product. Then, the sample harder and difficult to loosen than the control product was evaluated to be −2; the sample slightly harder and slightly difficult to loosen than the control product was evaluated to be −1; the sample equivalent to the control product was evaluated to be 0; the sample slightly softer and slightly easier to loosen than the control product was evaluated to be 1; and the sample softer and easier to loosen than the control product was evaluated to be 2. Each value (Tables 4 and 5) was collected, and the average value (Table 6) was determined to be the final sensory evaluation.

TABLE 4

Evaluation result of sherbet

|   |       | (1) | (2) | (3) | (4) | (5) | (6) | (7) | (8) | (9) | (10) | av. |
|---|-------|-----|-----|-----|-----|-----|-----|-----|-----|-----|------|-----|
| 1 | 0.25% | 2   | 2   | 2   | 1   | 2   | 2   | 2   | 2   | 2   | 1    | 1.8 |
| 2 | 0.5%  | 0   | 1   | -1  | 0   | 2   | 1   | -1  | 1   | 0   | 0    | 0.3 |
| 3 | 1.0%  | -1  | -1  | 1   | -1  | 1   | -1  | 0   | -1  | 0   | 1    | -0.2 |
| 4 | 2.0%  | 1   | -2  | 0   | -2  | -1  | -2  | 0   | 0   | 1   | -1   | -0.6 |
| 5 | 5.0%  | -2  | -2  | -2  | -2  | -2  | -2  | -2  | -2  | -2  | -1   | -1.9 |

TABLE 5

Evaluation result of frozen confectionery containing ice

|   |       | (1) | (2) | (3) | (4) | (5) | (6) | (7) | (8) | (9) | (10) | (11) | (12) | av. |
|---|-------|-----|-----|-----|-----|-----|-----|-----|-----|-----|------|------|------|-----|
| 1 | 0.25% | 1   | 1   | 1   | 1   | 1   | 1.5 | 2   | 1   | 2   | 1    | 1    | 2    | 1.3 |
| 2 | 0.5%  | 1   | 1   | 1   | 1   | 2   | 2   | 2   | 2   | 2   | 1    | 2    | 2    | 1.6 |
| 3 | 1.0%  | 0   | 2   | 2   | -1  | 1   | 1   | 2   | 0   | 2   | 2    | 1    | 1    | 1.1 |
| 4 | 2.0%  | -1  | 1   | 2   | -1  | 0   | 1   | 0   | -1  | 1   | 0    | 2    | 0.3  | 0.4 |
| 5 | 5.0%  | -2  | -1  | -1  | -1  | -1  | 1   | -2  | 0   | -2  | -1   | -1   | -2   | -1.1 |

It has been found that the product to which the isomaltodextrin was added at a low concentration to the mixture was softer and easier to loosen than the products to which the isomaltodextrin was not added and added at a high concentration.

Compared to the product to which the isomaltodextrin was not added, the products to which the isomaltodextrin was added at low concentrations of 0.25% and 0.5%, in both of the sherbet and the frozen confectionery containing ice, show a large value which means that the products are soft and easy to loosen.

TABLE 6

|                         |       | Sherbet   | Ice confectionery containing ice |
|-------------------------|-------|-----------|----------------------------------|
| Monitor                 |       | 10 people | 12 people                        |
| Temperature for provision |     | -14° C.   | -16° C.                          |
| Content                 | 0.00% | 0         | 0                                |
| by                      | 0.25% | 1.8       | 1.3                              |
| percentage              | 0.5%  | 0.3       | 1.6                              |
| in mixture              | 1.0%  | -0.2      | 1.1                              |
|                         | 2.0%  | -0.6      | 0.4                              |
|                         | 5.0%  | -1.9      | -1.1                             |

Measurement of Hardness

The hardness of the frozen confectionery containing ice, which was used for the sensory evaluation, was measured with a RHEONER II CREEP METER RE2-33005C manufactured by Yamaden Co., Ltd. The temperature of the sample was adjusted to -9° C., and the maximum load was measured with the use of a columnar plunger having a diameter of 5 mm. For each sample, 8 to 11 portions were measured, and the average value and standard deviation of the maximum load were determined. As is clear from Table 7, the result was that the products containing 0.25% of and containing 0.5% of isomaltodextrin in the mixture were significantly softer than the product containing no isomaltodextrin, and the product containing 5.0% of isomaltodextrin was significantly harder.

TABLE 7

| | Content by percentage of isomaltodextrin in mixture (%) | | | | | |
|---|---|---|---|---|---|---|
| | 0.0 | 0.25 | 0.5 | 1.0 | 2.0 | 5.0 |
| Average value of maximum load (N) | 13.5 | 8.3 | 8.8 | 10.5 | 12.8 | 17.8 |
| Standard deviation | 2.6 | 1.2 | 0.6 | 2.4 | 1.8 | 1.9 |

The present application is based on and claims priority from Japanese Patent Application No. 2017-110048 filed on Jun. 2, 2017, the content of which is incorporated herein by reference.

The invention claimed is:

1. A frozen confectionery containing ice, the frozen confectionery being stored in a frozen state to be eaten frozen and comprising a mixture part containing a milk product, the mixture part being mixed with shaved ice and containing isomaltodextrin in an amount of 0.25%-2.0% by weight.

2. The frozen confectionery containing ice according to claim 1, wherein the mixture part and the shaved ice are comprised at a ratio of 1:1 to 1:2.5.

3. The frozen confectionery containing ice according to claim 1, wherein a content of the isomaltodextrin with respect to the whole frozen confectionery containing ice is 0.07% to 1.0% by weight.

4. The frozen confectionery containing ice according to claim 3, wherein the content of the isomaltodextrin with respect to the whole frozen confectionery containing ice is 0.07% to 0.5% by weight.

5. The frozen confectionery containing ice of claim 1, wherein the content of the isomaltodextrin in the mixture part is 0.25% to 1.0% by weight.

6. The frozen confectionery containing ice of claim 1, wherein the content of the isomaltodextrin in the mixture part is 0.25% to 0.5% by weight.

7. A frozen confectionery stored in a frozen state to be eaten frozen, the frozen confectionery being constituted by sherbet containing isomaltodextrin in an amount of 0.25%-0.5% by weight.

* * * * *